Feb. 2, 1926.

T. A. HARTUNG 1,571,476

RIDING FRESNO SCRAPER

Filed June 4, 1925    2 Sheets-Sheet 1

Inventor
T. A. Hartung
By C. A. Snow & Co.
Attorneys.

Feb. 2, 1926. 1,571,476
T. A. HARTUNG
RIDING FRESNO SCRAPER
Filed June 4, 1925   2 Sheets-Sheet 2

Inventor
T. A. Hartung
By C. A. Snow & Co.
Attorneys

Patented Feb. 2, 1926.

1,571,476

UNITED STATES PATENT OFFICE.

THEODORE A. HARTUNG, OF AUSTIN, TEXAS.

RIDING FRESNO SCRAPER.

Application filed June 4, 1925. Serial No. 34,924.

*To all whom it may concern:*

Be it known that I, THEODORE A. HARTUNG, a citizen of the United States, residing at Austin, in the county of Travis and State of Texas, have invented a new and useful Riding Fresno Scraper, of which the following is a specification.

This invention relates to a road machine commonly known as a Fresno scraper, the primary object of the invention being to provide a riding Fresno scraper wherein the scoop may be readily moved from its scooping position to a dumping position, with the minimum amount of exertion on the part of the operator.

Another important object of the invention is to provide a Fresno scraper supported by wheels whereby the same may be moved from place to place, novel means being provided for bringing the wheels into their active positions.

Another object of the invention is to provide means to be controlled by the operator for elevating the scoop of the Fresno scraper to a position in spaced relation with the ground surface to allow the Fresno scraper to be moved to a place to dump its contents.

A still further object of the invention is to provide a scoop having runners adjacent to its forward edge, which runners act as supports for the scoop after it has been moved to its discharging position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
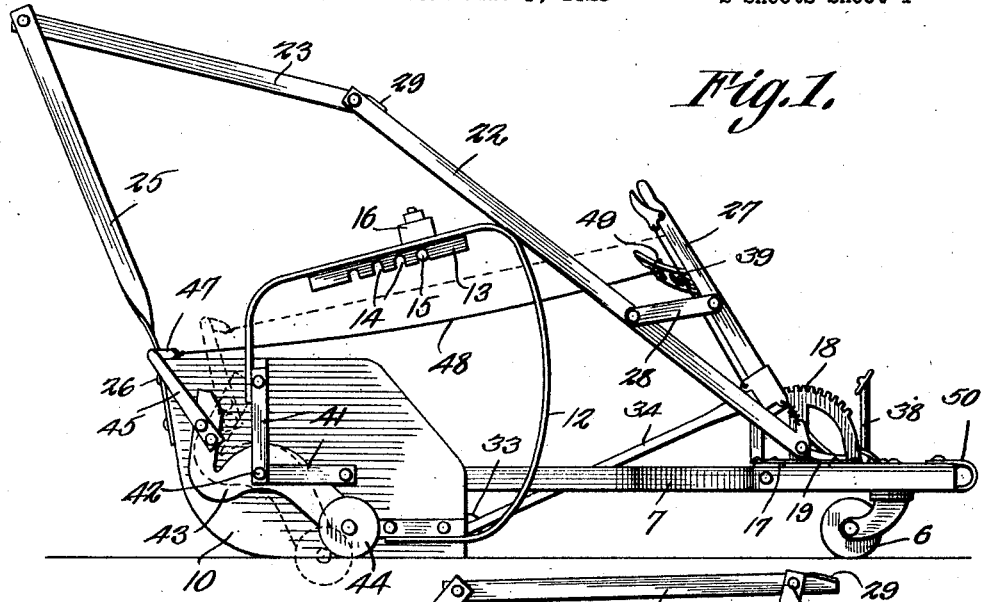
Figure 1 is a side elevational view of a Fresno scraper constructed in accordance with the invention.

Referring to the drawings in detail, the reference character 5 indicates the platform of a truck which is supported by the wheels 6 that are of the self-adjusting type so that the guiding of the scoop may be accomplished with facility.

Secured to the under surface of the platform 5 are the side members 7 that form a part of the frame of the machine, the side members being shown as extended outwardly as at 8 and rearwardly as at 9, the rear extremities of the members 9 being pivotally connected to the scoop 10 at 11, so that the scoop may swing freely with respect to the frame.

The reference character 12 indicates runners that have connection with the upper and lower edges of the scoop and extend forwardly to such positions that they will support the scoop and allow the scoop to slide along the ground surface when the scoop is in its dumping position.

Depending flanges 13 are provided on the runners and disposed adjacent to the upper portion thereof, which flanges are formed with notches 14 in which the hook members 15 are positioned, the hook members passing through the bar 16 that rests on the upper portion of the runners to adjustably secure the bar 16 to the runners. This bar 16 not only acts as a bracket to hold the runners in proper spaced relation with each other, but act as a stop to restrict pivotal movement of the scoop 10.

The forward ends of the side members 7 are held in proper spaced relation by means of the bar 17 which has its ends bent downwardly and bolted to the members 7 as clearly shown by the drawings.

The bar 17 is disposed in a plane with the platform 5 and also acts as a support for the rack bar 18 that is formed with a flange 19, which flange is bolted to the platform 5 at 20, and bolted to the bar 17 at 21. Pivotally supported by the rack bar is an arm 22 that has its upper end pivotally connected to the arm 23, at 24, the opposite end of the arm 24 being pivotally connected to the arm 25 that is bolted to the scoop 10 at 26, so that movement of the arm 22 is transmitted to the scoop 10 through the arms 23 and 25.

A controlling lever indicated at 27 is pivotally supported adjacent to the rack bar 18 and is connected with the arm 22 through the link 28 in such a way that as the lever 27 is moved, movement is transmitted to the arm 22 to accomplish the purpose as described. In order that movement between the arms 22 and 23 will be restricted, a flange 29 is provided on the arm 23, which flange is adapted to engage one edge of the arm 22, as shown by Figure 1 of the drawings, and prevent the scoop from tilting upwardly too far to accomplish the scooping action.

Mounted at the forward portion of the scoop is a swinging apron 30 that is adapted to close the forward portion of the scoop after it has been filled. Secured to the apron are arms 31 that are pivotally connected to the ends of the scoop by means of the bolts 32. An eye bolt indicated at 33 is secured to the apron at a point substantially intertermediate its ends which eye bolt receives one end of the rod 34, the opposite end thereof having pivotal connection with the arm 35 at 36.

The arm 36 is formed with a horizontal section to be engaged by the bearing member 37 that secures the arm to the platform 5. Formed integral with the arm and extending upwardly therefrom is a foot lever 38 located directly in front of the operator's seat 39 so that the operator seated on the seat 39, may, by the operation of his foot move the arm and rod 34 to raise the apron 36 and allow the material contained in the scoop to be discharged. It is obvious that as the pressure on the foot lever is released, the weight of the apron will cause it to return to its normal or closing position.

At the ends of the apron are shoulders 39 that are adapted to rest on the flanges forming a part of the angle irons of which the side members 7 are constructed to retain the material in the scoop, the apron being automatically moved to its inactive position when the fresno begins to dump. Bolted to the outer surfaces of the end members of the scoop are arms 41 that are offset and have their free ends connected by means of the bolts 42 that act as pivots for the curved arms 43 that support the wheels 44 at their lower ends, the opposite ends of the arms 43 extending upwardly where they are connected with the right angled end portions 45 of the rod 46. The rod 46 is provided with an offset portion 47 providing a clearance to permit the rod 46 to lie in close engagement with the arm 25, when the rod 46 is in its inactive position.

The offset portion 47 also provides a convenient place for the attachment of the flexible member 48 thereto so that the flexible member 48 may not move longitudinally of the rod 46.

The forward end of the flexible member 48 is secured to the operator's seat as at 49, to the end that the flexible member is supported in a position convenient to be operated by the person seated on the seat.

Carried by the platform is a link 50 that is provided for the purpose of attaching a suitable power device to the scoop whereby the scoop may be moved along the ground surface.

The operation of the device is as follows:

The scoop is moved along the ground surface whereby the scoop becomes filled with material. When the scoop has been filled, the operator removes his foot from the foot lever 38 allowing the apron to fall to a position to close the forward end of the scoop.

Flexible member 48 is now operated to move the wheels 44 to their active positions, and since the movement of the fresno is forward, the wheels 44 will be moved by the forward movement of the Fresno scraper to their active positions, elevating the scoop and permitting the scoop to be moved over the ground surface.

Figure 2:
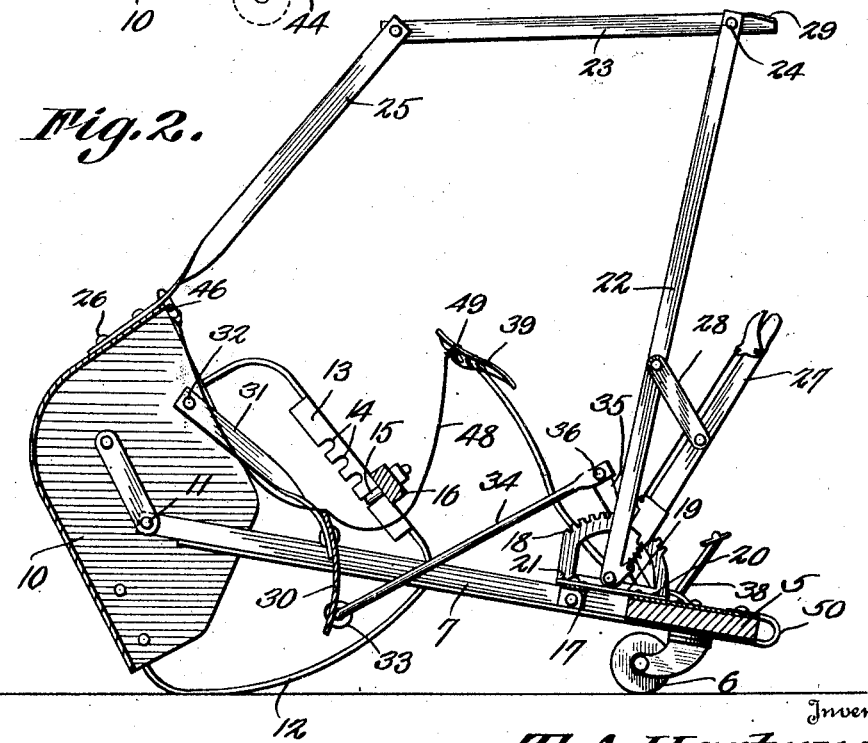
Figure 2 is a sectional view taken on line 2—2 of Figure 3.
Figure 3:
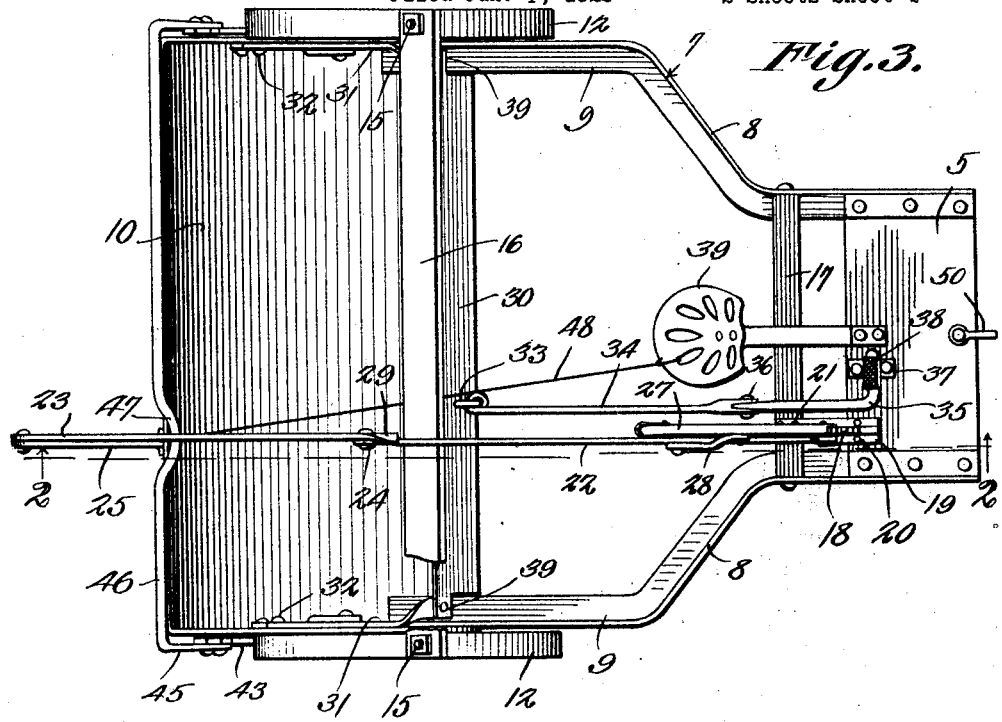
Figure 3 is a plan view thereof.
Figure 4:
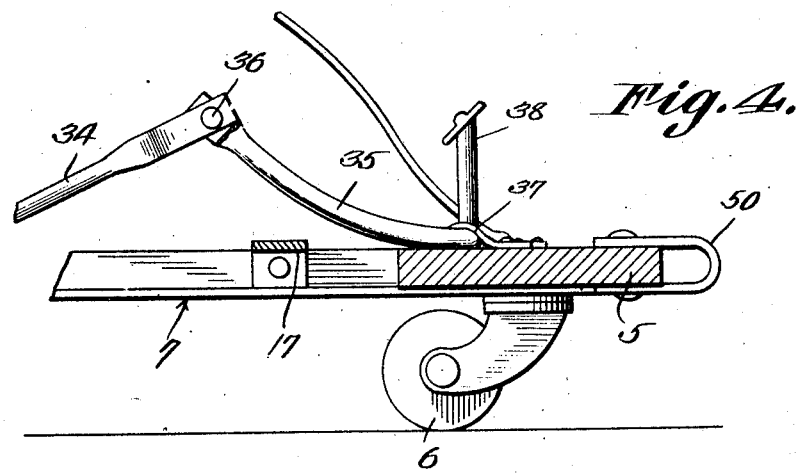
Figure 4 is a fragmental sectional view through the truck of the Fresno scraper.
Figure 5:
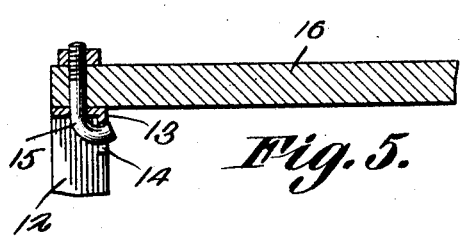
Figure 5 is a fragmental sectional view illustrating the connection between the bracing bar and the runners.

When the Fresno scraper has been moved to a place where the material is to be dumped, the lever 27 is operated to cause the scoop to tilt to a position as shown by Figure 2 of the drawing, the weight of the scoop being transferred to the runners 12 and the contents of the scoop discharged therefrom.

I claim:—

1. In a device of the character described, a platform, side members extending rearwardly from the platform, a scoop pivotally supported between the side members, curved arms pivotally mounted at the ends of the scoop, wheels carried by the arms and adapted to move to positions beyond the scoop to elevate the scoop, and means for moving the arms to move the wheels to their active positions.

2. In a device of the character described, a frame including a platform, means for supporting the platform, a tilting scoop mounted at the rear of the frame, arms pivotally supported by the scoop and arranged at the ends thereof, wheels carried by the arms, and means for operating the arms to move the wheels to their active positions to elevate the scoop.

In testimony that I claim the foregoing as my own, I have hereto affixed my signature.

THEODORE A. HARTUNG.